United States Patent
Kato et al.

[11] Patent Number: 5,954,309
[45] Date of Patent: Sep. 21, 1999

[54] ALUMINUM ALLOY BRACKET FOR FIXING ELASTIC MOUNT, ASSEMBLY OF ELASTIC MOUNT AND BRACKET, AND METHOD OF PRODUCING THE BRACKET BY EXTRUSION

[75] Inventors: Rentaro Kato, Kasugai; Sadao Kokubo, Akinomachi; Shunta Ushioda, Yuki, all of Japan

[73] Assignees: Tokai Rubber Industries, Ltd.; Showa Aluminum Corporation, both of Japan

[21] Appl. No.: 08/895,816

[22] Filed: Jul. 17, 1997

[30] Foreign Application Priority Data

Jul. 26, 1996 [JP] Japan ................................... 8-197505

[51] Int. Cl.⁶ .................................................. F16M 13/00
[52] U.S. Cl. ......................... 248/636; 248/562; 180/312; 267/140.11
[58] Field of Search ..................................... 248/638, 637, 248/634, 674, 618, 636, 610, 300, 560, 200, 562, 205.1, 205.3, 630; 180/312, 291, 299; 181/173; 267/140.11; 188/312

[56] References Cited

U.S. PATENT DOCUMENTS

| | | | |
|---|---|---|---|
| 1,698,453 | 1/1929 | Sardeson et al. | 180/312 |
| 4,546,848 | 10/1985 | Iijima et al. | 180/312 |
| 4,570,911 | 2/1986 | Konishi | 267/8 R |
| 5,054,752 | 10/1991 | Tabata | 267/140.1 |
| 5,080,332 | 1/1992 | Yoda et al. | 267/140.11 |
| 5,090,502 | 2/1992 | Inoue et al. | 180/312 |
| 5,219,037 | 6/1993 | Smith et al. | 180/312 |
| 5,246,212 | 9/1993 | Funahashi et al. | 267/140.13 |
| 5,263,815 | 11/1993 | Brenner | 267/219 |
| 5,291,967 | 3/1994 | Aoki | 180/312 |
| 5,375,821 | 12/1994 | Toshimitsu et al. | 267/140.12 |
| 5,693,917 | 12/1997 | Bertagni et al. | 181/173 |

FOREIGN PATENT DOCUMENTS 36 10216 A1  10/1987  Germany.
5-50860  3/1993  Japan.

*Primary Examiner*—Derek J. Berger
*Assistant Examiner*—Tan Le
*Attorney, Agent, or Firm*—Parkhurst & Wendel, L.L.P.

[57] ABSTRACT

A bracket made of an aluminum alloy for fixing an elastic mount to one of two members to be elastically connected to each other through the elastic mount interposed therebetween. The bracket is formed by extrusion, and has at least one aperture formed therethrough so as to extend in the direction of extrusion. A first succession of recessed and raised portions are formed on at least a part of a fixing surface that is fixable to the elastic mount, and a second succession of recessed and raised portions are formed on at least a part of an exposed surface thereof which is exposed to the atmosphere upon fixing of the bracket to the elastic mount. The recessed and raised portions extend in the direction of extrusion, and are formed alternately in a direction perpendicular to the direction of extension.

14 Claims, 4 Drawing Sheets

ALUMINUM ALLOY BRACKET FOR FIXING ELASTIC MOUNT, ASSEMBLY OF ELASTIC MOUNT AND BRACKET, AND METHOD OF PRODUCING THE BRACKET BY EXTRUSION

BACKGROUND OF THE INVENTION

1. Field of the Invention

The present invention relates to a bracket for fixing a rubber mount or elastic mount to one of two members which are elastically connected to each other through the elastic mount, an assembly of the elastic mount and the bracket, and a method of producing the bracket.

2. Discussion of the Related Art

In a vibration system such as a system adapted to elastically support a vibrating member like a power unit including an internal combustion engine and a muffler or exhaust pipe, there is known an elastic mount including a rubber member, which is interposed between two members which are elastically connected to each other through the elastic mount so as to damp a vibrational load applied therebetween. A metallic bracket is usually used for fixing such an elastic mount to one of those two members, taking account of the fixing efficiency and the construction of the member to which the elastic mount is fixed. In particular, brackets made of an aluminum alloy have been recently employed in place of conventional iron brackets, in an effort to reduce the weight and increasing the natural frequency (resonance frequency) of the bracket.

Generally, aluminum alloys have generally higher thermal conductivity than irons, and heat is more likely to be transferred through the aluminum alloy bracket from the member to which the elastic mount is fixed, to the elastic mount. Therefore, where the elastic mount is an engine mount fixed to an engine or a muffler mount fixed to a muffler, the elastic mount tends to be heated due to transfer of heat from the engine or muffler to the elastic mount, whereby the elastic mount tends to suffer from thermal deterioration and reduced durability.

While the elastic mount may be made of a highly heat-resistant rubber material, this solution to the above problem results in reduced freedom of choice of the rubber material, making it difficult to provide the elastic mount with desired dynamic vibration damping characteristics (e.g., a sufficiently high dynamic spring constant). Therefore, the above solution is not necessarily satisfactory.

SUMMARY OF THE INVENTION

It is therefore a first object of the present invention to provide an aluminum alloy bracket for fixing an elastic mount to one of two members to be elastically connected to each other through the elastic mount, which bracket is simple in construction, easy to manufacture and effective to minimize heat transfer from the member in question to the elastic mount to thereby prevent or minimize thermal deterioration of the elastic mount.

It is a second object of the invention to provide an assembly of an elastic mount and such an aluminum alloy bracket.

It is a third object of the invention to provide a method of producing the aluminum alloy bracket.

The first object indicated above may be achieved according to a first aspect of this invention, which provides a bracket made of an aluminum alloy for fixing an elastic mount to one of two members which are to be elastically connected to each other through the elastic mount interposed therebetween, wherein the bracket is formed by extrusion of the aluminum alloy, and has at least one aperture formed therethrough so as to extend in a direction of extrusion of the aluminum alloy, and also has a first succession of recessed and raised portions formed on at least a part of a fixing surface thereof at which the bracket is fixed to the elastic mount, and a second succession of recessed and raised portions formed on at least a part of an exposed surface thereof which is exposed to an atmosphere when the bracket is fixed to the elastic mount and the above-indicated one of the two members. The recessed and raised portions of each of the first and second successions extend in the direction of extrusion, and are formed alternately in a direction perpendicular to the direction of extension.

The exposed surface may include surfaces defining the aperture or apertures. Namely, the recessed and raised portions may be formed on the desired parts of the surfaces of the aperture or apertures.

In the bracket constructed according to the first aspect of this invention, the aperture or apertures and the second succession of recessed and raised portions formed on the exposed surface contribute to an increase in the area of the surface which is exposed to the atmosphere and from which heat is dissipated from the bracket, whereby the present bracket exhibits a sufficiently high degree of heat dissipation or cooling efficiency.

Accordingly, the amount of heat that is transferred through the bracket to the elastic mount is effectively reduced, with a result of preventing or minimizing an increase in the temperature of the elastic mount due to the heat transfer thereto through the bracket, thereby preventing or minimizing deterioration of durability of the elastic mount due to the heat transfer. Further, the present bracket is effective to reduce the required heat resistance of the rubber material of the elastic mount, thereby permitting increased freedom of choice of the rubber material, resulting in increased freedom of design of the elastic mount regarding its damping characteristics. Thus, the bracket according to the present invention permits the elastic mount to be easily designed so as to exhibit the desired damping characteristics with high stability.

It is noted that the apertures and the recessed and raised portions may be easily and economically formed in the process of extrusion of the bracket, without any machining operations, whereby the bracket is available at a relatively low cost.

Further, the first succession of recessed and raised portions formed on the fixing surface of the bracket provides a relatively large area for bonding to the elastic mount, where an assembly of the elastic mount and the bracket is fabricated by vulcanization of the rubber material to form the elastic mount. In this case, the bracket can be firmly bonded at its fixing surface having the recessed and raised portions to the elastic mount, with a sufficiently large bonding force therebetween, without any metal parts and bolts or other fastening means which would be otherwise required for mechanically fixing the bracket and the elastic mount. Accordingly, the elastic mount can be simplified without a metal fitting. Even where the bracket is directly bonded to the elastic mount, the amount of heat transferred from the bracket to the elastic mount is reduced owing to the increased surface area of heat dissipation provided the surfaces of the aperture or apertures and the recessed and raised portions formed on the exposed surface, whereby the thermal deterioration of the elastic mount is minimized.

In one preferred form of the bracket according to the present invention, the first succession of recessed and raised portions has a dimension of 0.3–1.0 mm, which is a distance between the bottom of the recessed portions and the top of the raised portions, as measured in a direction perpendicular to the fixing surface and the exposed surface. Further, the recessed and raised portions of the first succession are alternately formed at a pitch of 0.5–2.0 mm in the direction perpendicular to the direction of extension.

The first succession of recessed and raised portions dimensioned as described above assures a sufficiently large force of bonding between the bonding (fixing) surface of the bracket and the corresponding surface of the elastic mount, and makes it possible to reduce local stress concentration at the bonding interface between the bracket and the elastic mount. Accordingly, the recessed and raised portions dimensioned according to the above-indicated preferred form of the invention are effective to prevent cracking of the elastic mount due to the local stress concentration, which would deteriorate the durability of the elastic mount. If the dimension between the bottom and top of the adjacent recessed and raised portions is smaller than 0.3 mm, or the pitch of the alternate recessed and raised portions is larger than 2.0 mm, the effect of the recessed and raised portions to increase the area of the fixing surface of the bracket is not sufficient. If the above-indicated dimension is larger than 1.0 mm or the pitch is smaller than 0.5 mm, the adjacent recessed and raised portions tend to form a relatively sharp edge therebetween, leading to a risk of local stress concentration at the bonding interface between the fixing surface of the bracket and the corresponding surface of the elastic mount, and consequent deterioration of the durability of the elastic mount. Further, the extruding operation using an extruder die to form the bracket tends to be difficult in the latter case.

In another preferred form of the bracket of the present invention, the recessed and raised portions of the first succession cooperate with each other to define a continuously corrugated surface which provides the above-indicated part of the fixing surface. The term "continuously corrugated surface" is interpreted to mean a corrugated surface which does not have discontinuity or sharp edges or bends between the adjacent recessed and raised portions. For instance, each of the recessed and raised portions of each of the first and second successions may be defined by a surface which is substantially arcuate in cross section taken in a plane which is perpendicular to the direction of extrusion and the fixing and exposed surfaces. In this case, the adjacent recessed and raised portions have common tangent lines.

The above preferred form of the bracket is advantageous particularly when it is bonded to the elastic mount. Namely, the arcuately shaped recessed and raised portions are effective to reduce the local stress concentration at the bonding interface between the bracket and the elastic mount, resulting in an increase in the durability of the elastic mount.

The second succession of recessed and raised portions formed on the exposed surface of the bracket contributes to an increase in the surface area of heat dissipation of the bracket. For effectively increasing the surface area of heat dissipation and facilitating the extrusion, the second succession of recessed and raised portions is also preferably dimensioned as described above with respect to the first succession of recessed and raised portions. That is, the dimension between the bottom and top of the adjacent recessed and raised portions of the second succession formed on the exposed surface is preferably selected within the range of 0.3–1.0 mm, while the pitch is selected within the range of 0.5–2.0 mm. Further, the recessed and raised portions of the second succession are also preferably defined by substantially arcuate surfaces, for avoiding sharp edges on the exposed surface, which may cause undesirable reduction in the cooling effect of the exposed surface due to air staying at such sharp edges.

The second object indicated above may be achieved according to a second aspect of this invention, which provides an assembly for elastically connecting two members to each other, including an elastic mount and a bracket for fixing an elastic mount to one of the two members, wherein the bracket is formed by extrusion, and has at least one aperture formed therethrough so as to extend in a direction of extrusion of the bracket, and also has a first succession of recessed and raised portions formed on at least a part of a bonding surface thereof at which the bracket is bonded to the elastic mount, and a second succession of recessed and raised portions formed on at least a part of an exposed surface thereof which is exposed to an atmosphere when the bracket is bonded to the elastic mount and the above-indicated one of the two members. The recessed and raised portions of each of the first and second successions extend in the direction of extrusion, and are formed alternately in a direction perpendicular to the direction of extension, and wherein the elastic mount is bonded directly to the bonding surface of the bracket.

In the assembly of the elastic mount and the bracket according to the second aspect of this invention, the elastic mount is bonded to the bracket which has the aperture or apertures and the first and second successions of recessed and raised portions as described above with respect to the first aspect of the invention. Accordingly, the amount of heat transferred through the bracket to the elastic mount is significantly reduced to minimize an increase in the temperature of the elastic mount, and the bonding force between the bracket and the elastic mount is effectively increased. The present assembly which has increased durability and is capable of exhibiting improved damping characteristics is simple in construction and is available at a relatively low cost.

For further increase of the bonding strength between the bracket and the elastic mount and further increase of the durability elastic mount, it is preferred that the dimension between the bottom and top of the adjacent recessed and raised portions formed on the bonding surface of the bracket be selected within a range of 0.3–2.0 mm, while each of the recessed and raised portions of the first succession be defined by a substantially arcuate surface, as described above with respect to the first aspect of the invention.

The third object indicated above may be achieved according to a third aspect of this invention, which provides a method of producing a bracket made of an aluminum alloy for fixing an elastic mount to one of two members which are to be elastically connected to each other through the elastic mount interposed therebetween, the bracket having a fixing surface at which the bracket is fixed to the elastic mount, and an exposed surface which is exposed to an atmosphere when the bracket is fixed to the elastic mount and the above-indicated one of the two members, the method comprising the steps of: forming an extruded structure by extruding an aluminum alloy, such that the extruded structure has at least one aperture formed therethrough so as to extend in a direction of extrusion of the aluminum alloy, and a first succession of recessed and raised portions formed on at least a part of a first surface thereof corresponding to the fixing surface of the bracket, and a second succession of recessed and raised portions formed on at least a part of a second surface thereof corresponding to the exposed surface of the bracket, the recessed and raised portions of each of the first and second successions extending in the direction of extrusion, and being formed alternately in a direction perpendicular to the direction of extension; and cutting the extruded structure in a plane perpendicular to the direction of extrusion, into a plurality of pieces each having has a predetermined dimension in the direction of extrusion, the each piece providing the bracket having at least one aperture corresponding to the at least one aperture of the extruded structure, and a first succession of recessed and raised portions and a second succession of recessed and raised portions which correspond to the first and second successions of recessed and raised portions formed on the first and second surfaces of the extruded structure, respectively, the first succession of recessed and raised portions of the bracket being formed on at least a part of the fixing surface, while the second succession of recessed and raised portions of the bracket being formed on at least a part of the exposed surface.

According to the method of the third aspect of the present invention, the bracket according to the first aspect aspect of the invention or the bracket of the assembly according to the second aspect of the invention may be produced with high efficiency, by extrusion of the aluminum alloy to form the extruded structure and by cutting this extruded structure. Namely, the extruded structure is formed with at least one aperture corresponding to at least one aperture of the bracket, and recessed and raised portions corresponding to the first and second successions of recessed and raised portions formed on the fixing and exposed surfaces of the bracket. These apertures and recessed and raised portions for reducing the amount of heat transferred through the bracket to the elastic mount and for increasing the bonding strength between the bracket and the elastic mount are formed in the process of extrusion of the aluminum alloy, without any machining. In addition, a plurality or multiplicity of brackets can be produced by cutting the extruded structure into respective pieces, so that the production efficiency of the bracket is considerably high.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
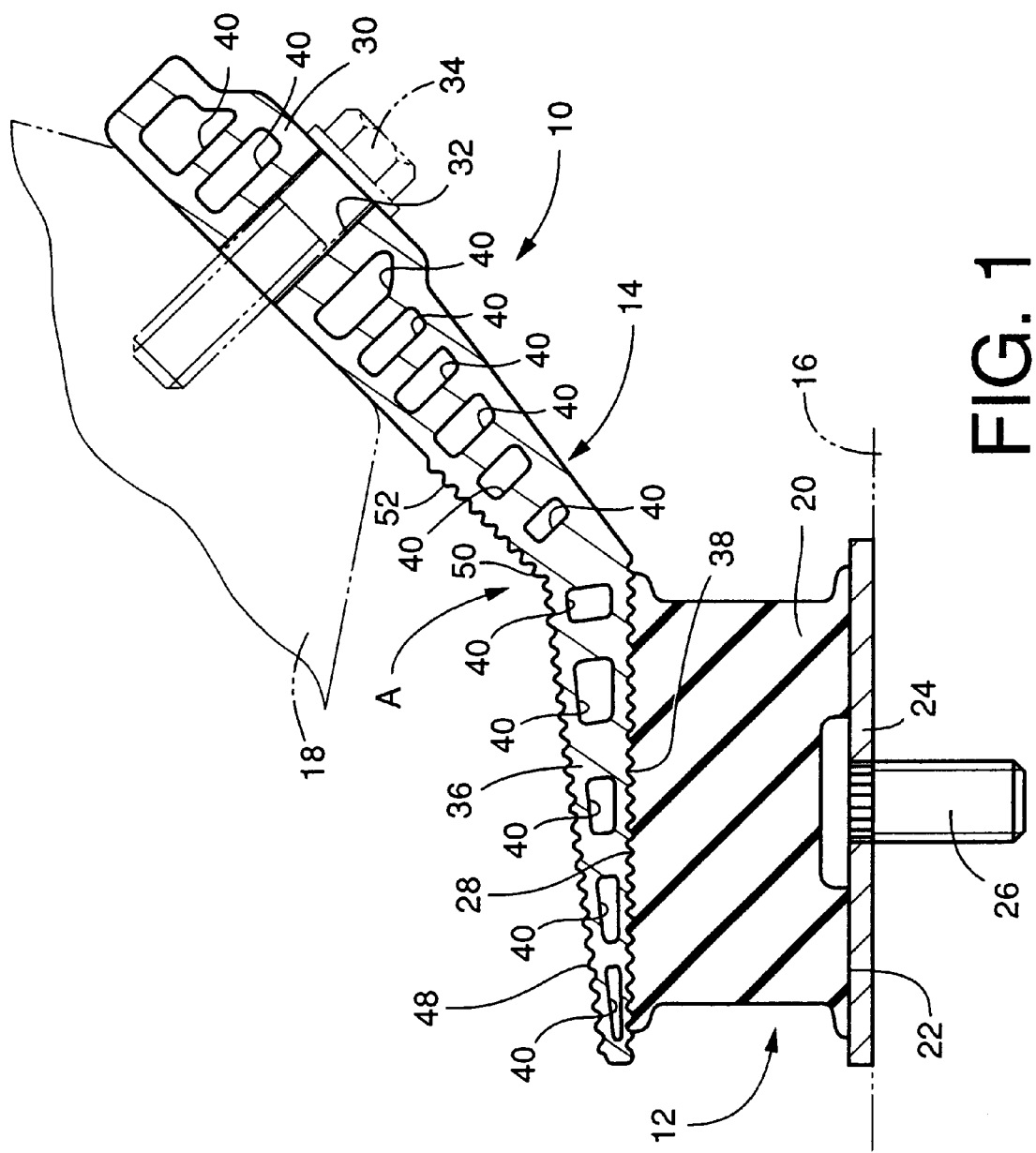
FIG. 1 is an elevational view in vertical cross section of an assembly of an elastic mount in the form of an engine mount and a bracket for fixing the engine mount to a power unit of an automotive vehicle, which bracket is constructed according embodiment of this invention.
Figure 2:
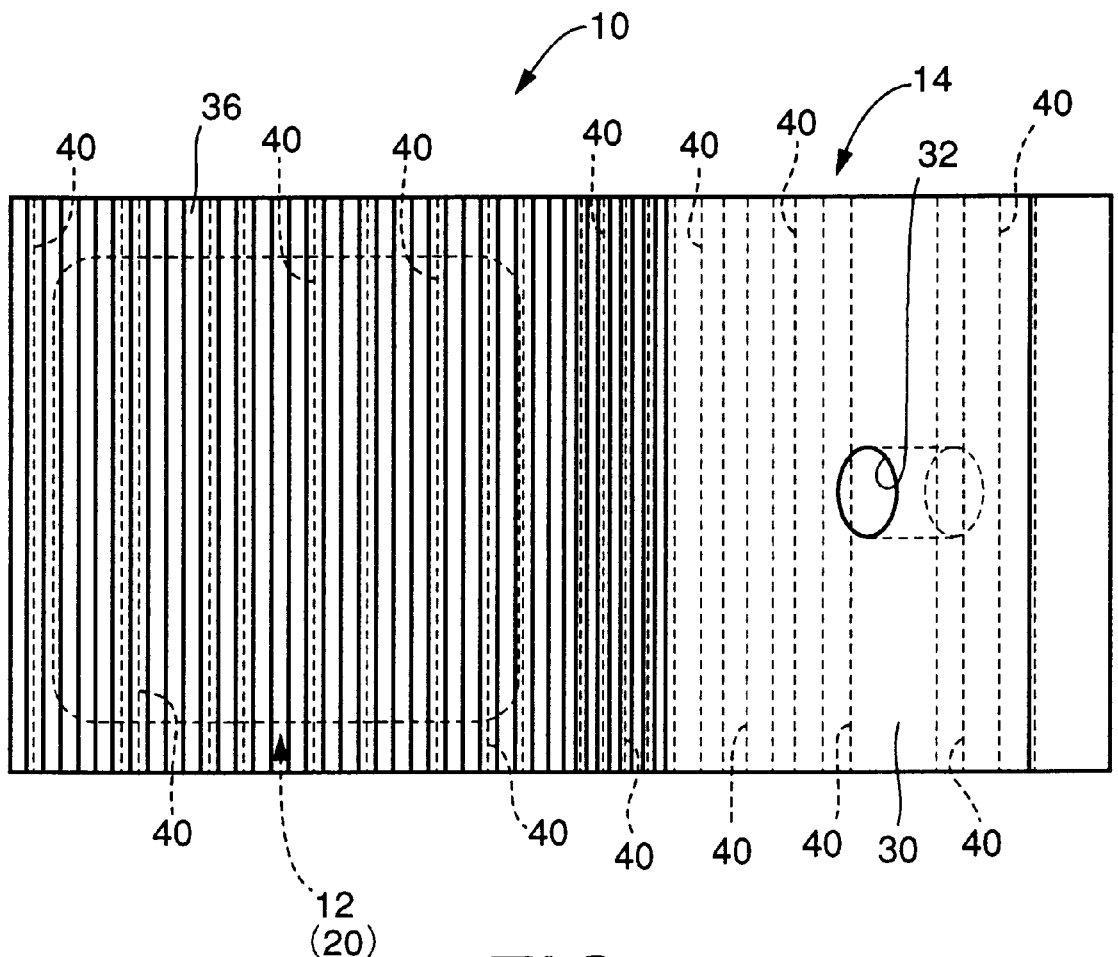
FIG. 2 is a plan view of the bracket shown in FIG. 1.
Figure 3:
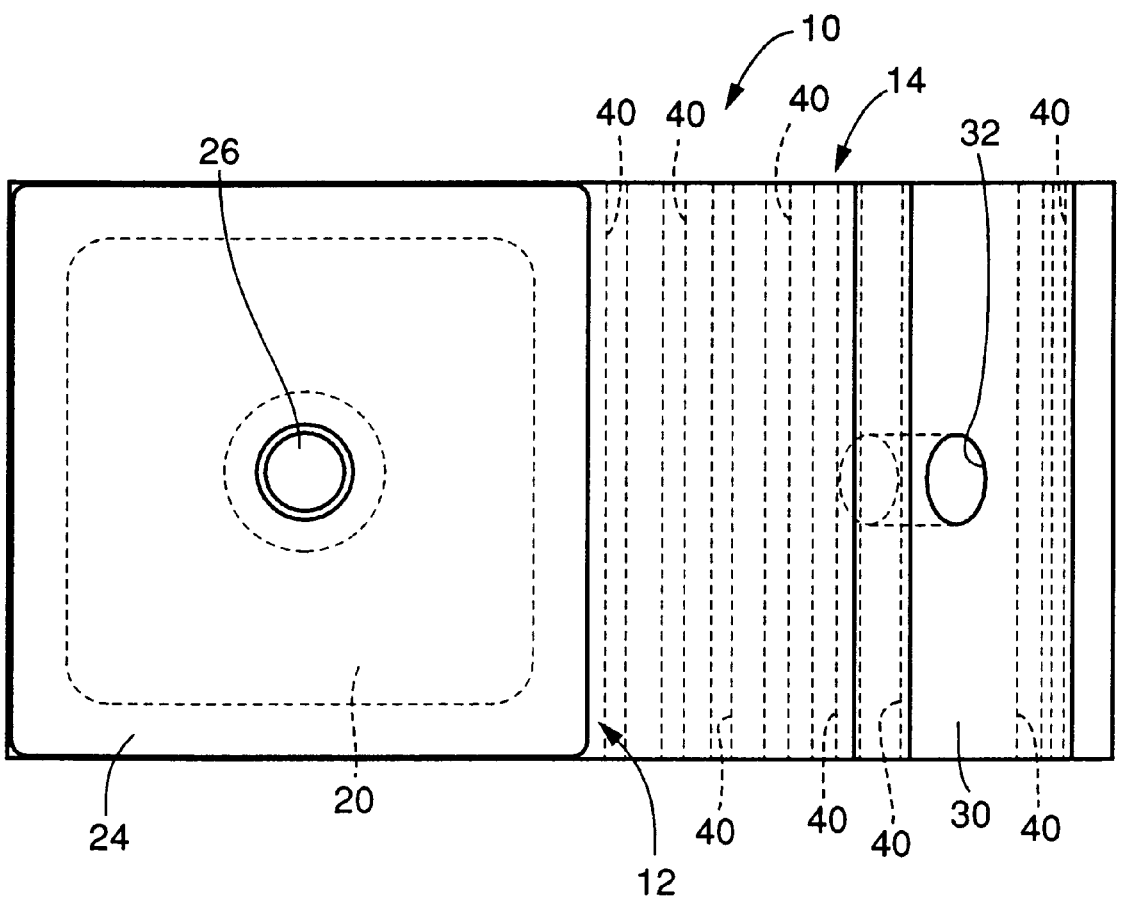
FIG. 3 is a bottom plan view of the engine mount and the bracket of FIG. 1.

Referring first to FIGS. 1–3, there is shown an assembly 10 according to one embodiment of this invention. The assembly 10 consists of an elastic mount in the form of an engine mount 12 including an elastic body made of a rubber material, and a bracket 14 made of an aluminum alloy. The assembly 10 is interposed between a body 16 of an automotive vehicle and a power unit 18 including an engine, so that these two members 16, 18 are elastically connected to each other through the elastic body 12. Namely, the power unit 18 is mounted on the vehicle body 16 through the engine mount 12, in a vibration damping manner. In FIG. 1, the vehicle body 16 and power unit 18 are indicated by two-dot chain lines.

Described in detail, the engine mount 12 includes an elastic body 20 which is a rectangular block of a suitable rubber material. The elastic body 20 has two opposite mounting surfaces 22, 28. In the process of vulcanization of the rubber material to form the elastic body 20, a rectangular mounting plate 24 is bonded to the lower mounting surface 22. The mounting plate 24 is provided with a fixing bolt 26 which has a head portion and an externally threaded portion. The head portion is embedded in the elastic body 20 and is secured to the inner surface of the mounting plate 24. The externally threaded portion of the fixing bolt 26 extends through a central portion of the mounting plate 24 in an outward direction away from the mounting surface 22. The engine mount 12 is fixed at its mounting plate 24 to the vehicle body 16 by the fixing screw 26.

To the other or upper mounting surface 28 of the elastic body 20, there is bonded the bracket 14 in the above-indicated vulcanization process. This bracket 14 is bolted to the power unit 18 of the vehicle, so that the engine mount 12 is fixed to the power unit 18 through the bracket 14.

The bracket 14 is a structure having a generally rectangular shape as seen in top and bottom plans views in FIGS. 2 and 3, and is bent at an intermediate portion A, which is intermediate as viewed in a longitudinal direction (in the horizontal direction as seen in FIGS. 2 and 3). The bend extends over the entire width of the intermediate portion A, the width direction (vertical direction as viewed in FIGS. 2 and 3) being perpendicular to the longitudinal direction. The bracket 14 includes a first portion 30 on one side of the intermediate bent portion A. The first portion 30 has a bolt hole 32 formed through the thickness of a part near its free end remote from the intermediate bent portion A. The bracket 14 is fixed at its first fixing portion 30 to the power unit 18 indicated by two-dot chain line in FIG. 1, with a bolt 34 inserted through the bolt hole 32.

The thickness of the first portion 30 decreases in the longitudinal direction from the above-indicated free end to the fixed end adjacent the intermediate portion A, and includes a second portion on the other side of the intermediate bent portion A remote from the first portion 30. The second fixing portion 36 has a bonding portion 38 which is a lower surface as seen in FIG. 1. The bracket 14 is bonded at this bonding surface 38 to the upper mounting surface 28 of the elastic body 20 of the engine mount 12. Thus, the engine mount 12 is fixed to the power unit 18 through the bracket 14.

As described above, the bracket 14 is fixed at its first portion 30 to the power unit 18, and at its second portion 12 to the engine mount 36, so that the engine mount 12 is fixed to the power unit 18 through the bracket 14.

The bracket 14 has thirteen apertures 40 formed therethrough in the width direction (perpendicular to the plane of FIG. 1). Each of these apertures 40 has a predetermined constant cross sectional shape over the entire width of the bracket 14. The apertures 40 are substantially evenly distributed in the longitudinal direction of the bracket 14, such that the adjacent apertures 40 are spaced apart from each other by a suitable distance in the longitudinal direction.

Figure 4:
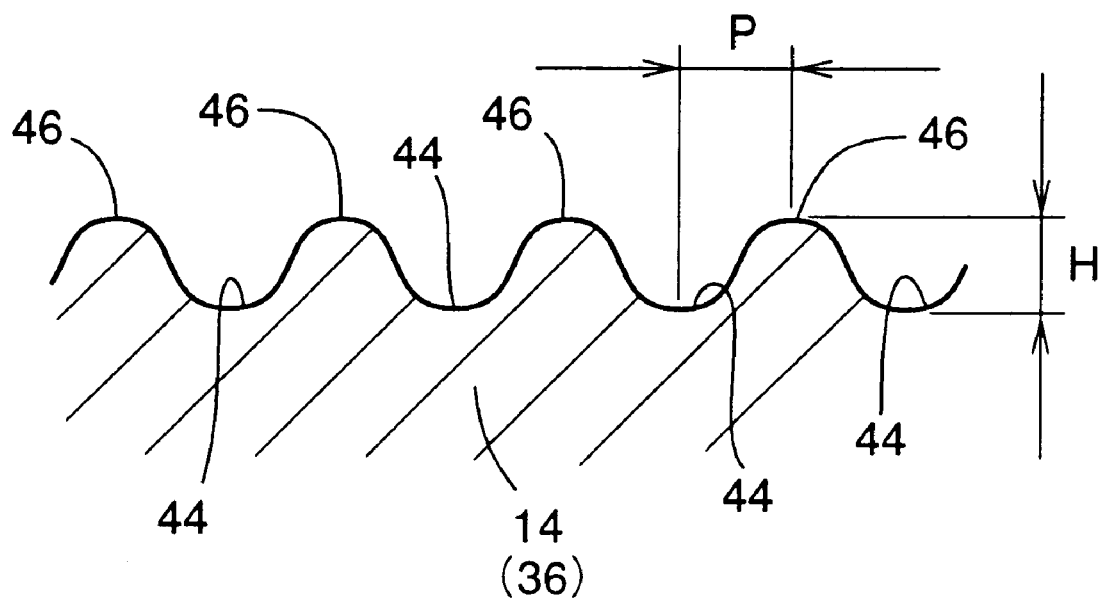
FIG. 4 is an enlarged fragmentary view in cross section of the bracket.

The bonding surface 38 of the second fixing portion 36 has a first succession of recessed and raised portions 44, 46, as shown in FIG. 4. These recessed and raised portions 44, 46 are formed so as to extend in parallel with each other over the entire dimension of the second fixing portion 36 in the width direction. The recessed and raised portions 44, 46 are formed alternately in the longitudinal direction of the bracket 14. As shown in FIG. 1, a second succession of recessed and raised portions 44, 46 is formed on the other surface 48 of the second portion 36 which cooperates with the bonding portion 38 to define the thickness of the second portion 36, and is also formed the adjacent surface 50 of the intermediate portion A and a part 52 of the surface of the first fixing portion 30, which part 52 is adjacent to the surface 50 of the intermediate portion A. These surfaces 48, 50, 52 are exposed to the atmosphere and are collectively referred to as "exposed surface". The second succession of recessed and raised portions 44, 46 formed on the surfaces 48, 50, 52 is similar in configuration and dimension to the first succession of recessed and raised portions 44, 46 formed on the bonding surface 38.

Described more specifically, the alternately formed parallel recessed and raised portions 44, 46 extending over the entire width of the bracket 14 have a depth or height dimension H which is preferably selected within a range of 0.3–1.0 mm. As indicated in the enlarged cross sectional view of FIG. 4, the dimension H is a distance between the bottom of each recessed portion 44 and the top of the adjacent raised portion 46, as measured in a direction perpendicular to the bonding surface 38 and the exposed surface 48, 50, 52. Further, the adjacent recessed and raised portions 44, 46 preferably have a center-to-center distance P in the longitudinal direction in which the recessed and raised portions 44, 46 are alternately formed. The center-to-center distance P is a distance between the center of each recessed portion 44 and the center of the adjacent raised portion 46, as measured in the longitudinal direction. In other words, the recessed and raised portions 44, 46 are alternately formed at a pitch equal to the center-to-center distance P in the longitudinal direction, as indicated in FIG. 4. This distance P is preferably selected within a range of 0.5–2.0 mm.

Each of the recessed and raised portions 44, 46 is defined by a surface which is substantially arcuate in cross section taken in a plane which is perpendicular to the direction of extrusion and the bonding surface 38 and the exposed surface 48, 50, 52. These arcuate surfaces of the adjacent recessed and raised portions 44, 46 are continuously connected to each other without discontinuity or a sharp edge or bend, whereby the bonding surface 38 and the surfaces 48, 50, 52 indicated above are continuously curved or corrugated in the form of a wave.

The bracket 14 having the apertures 40 and the succession of recessed and raised portions 44, 46 may be readily produced in an extrusion process, as described above.

That is, a cast ingot of an aluminum alloy having a suitable composition is subjected to an extruding operation using a suitable die, to produce an extruded structure having the same cross sectional shape as the bracket 14. Namely, the extruded structure has apertures and recessed and raised portions corresponding to the apertures 40 and the first and second successions of recessed and raised portions 44, 46 of the bracket 14. Those apertures and recessed and raised portions of the extruded structure are formed so as to extend in the direction of extrusion of the aluminum alloy ingot. The aluminum alloy used is preferably an Al—Mg—Si alloy according to JIS A6061 (AA6061) and JIS A6N01, or an alloy similar to this alloy, for improving the strength and corrosion resistance of the extruded bracket 14. Commonly known extrusion techniques may be used for fabricating the bracket 40. However, hot-extrusion techniques are preferred.

The extruded structure is then cut in parallel planes perpendicular to the direction of extrusion, into pieces each having a width dimension equal to the width of the bracket 14. The extruded structure or each piece obtained by cutting the extruded structure is subjected to a drilling operation to form the bolt hole 32. Thus, the bracket 14 corresponding to each piece obtained by cutting the extruded structure is produced. Before this cutting step, the extruded structure is subjected to suitable operation or operations for removing strains in the extruded structure. Further, the extruded structure is subjected to a suitable heat treatment step such as hardening, before or after the cutting step.

The assembly 10 consisting of the engine mount 12 and the bracket 14 thus fabricated is obtained by: preparing the mounting plate 24 with the fixing bolt 26 secured thereto; positioning the bracket 14 and this mounting plate 24 in a suitable mold, such that the second portion 36 of the bracket 14 is opposed to the mounting bracket 24; and vulcanizing a suitable rubber material injected between the fixing portion 36 and the mounting plate 24, so as to form the elastic body 20 which is bonded at its mounting surface 22 to the mounting plate 24 and at the mounting surface 28 to the bracket 14. With the succession of recessed and raised portions 44, 46 being formed on the bonding portion 38 of the bracket 14, the mounting surface 28 of the elastic body 20 is curved or corrugated following the profile of the recessed and raised portions 44, 46 of the bonding surface 38, so that the mounting surface 28 is securely bonded to the bonding surface 38.

In the assembly 10 constructed as described above, the bracket 14 has a sufficiently large surface area exposed to the atmosphere, in the presence of the apertures 40, and the recessed and raised portions 44, 46 formed on the surface 48 on one side of the the bracket 14 opposite to the bonding surface 38, and the surfaces 50, 52 adjacent to the surface 48. Consequently, the heat is effectively dissipated from the bracket 14 so as to cool the bracket 14, so that the heat transfer from the power unit 18 to the engine mount 12 through the bracket 14 is minimized so as to prevent or minimize the deterioration of the elastic body 20 of the engine mount 12 due to the heat transferred through the bracket 14. Accordingly, the durability of the engine mount 12 is improved according to the present embodiment.

Further, the succession of recessed and raised portions 44, 46 on the bonding surface 38 provide the elastic body 20 with a sufficiently large area of bonding to the second fixing portion 36 of the bracket 14. Accordingly, the force and durability of bonding between the elastic body and the bracket 14 are increased. In addition, the direct bonding of the elastic body 20 to the bracket 14 eliminates metal parts and fastening means such as bolts which would be otherwise required for fixing the engine mount 12 to the bracket 14. This arrangement is effective to reduce the number of the required parts and the weight of the assembly 10, simplify the construction of the assembly 10, and facilitate the manufacture of the assembly 10.

It is also noted that since the corrugated bonding portion 38 consisting of the alternately formed recessed and raised portions 44, 46 is a continuously curved surface without a sharp edge or bend, damages of the elastic body 20 such as cracking due to local stress concentration are effectively prevented or reduced, permitting a further improvement in the bonding force and durability of the elastic body 20 with respect to the bracket 14. As indicated above, the recessed and raised portions 44, 46 each having an arcuate shape has a radius of curvature r, which is preferably selected to satisfy 0.3 mm≦r≦1.0 mm. Further, the radius of curvature r of each recessed portion 44 is preferably equal to that of each raised portion 46. These arrangements assure improved continuity of corrugation of the bonding portion 38 over the entire area, and prevent local stress concentration in the elastic body 20 which would take place due to the curvature having a small radius, whereby the elastic body 20 can be bonded to the bracket 14 with further increased bonding force and durability.

Where the recessed and raised portions 44, 46 formed on the surfaces 48, 50, 52 are shaped and dimensioned like the recessed and raised portions 44, 46 formed on the bonding surface 38, those recessed and raised portions 44, 46 provided for cooling the bracket 14 by heat dissipation do not suffer from undesirable air staying adjacent to the surfaces 48, 50, 52, in the absence of sharp edges or bends between the adjacent recessed and raised portions 44, 46, and have a sufficiently large strength owing to the sufficiently large radius of curvature. In addition, the present arrangement makes it possible to improve the fabricating efficiency of the bracket 14 by extrusion.

According to the method of producing the bracket 14 described above, the apertures 40 and the recessed and raised portions 44, 46 can be formed simultaneously with the formation of the bracket 14 by extrusion. Accordingly, the present method permits the bracket 14 to be produced with improved efficiency and reduced cost, while assuring improved cooling or heat dissipating efficiency and increased bonding strength with respect to the elastic body 20, as discussed above.

In addition, the apertures 40 and the recessed and raised portions 44, 46 have desired shapes and dimensions with high stability, since they are formed in the process of extrusion to form the bracket 14, rather than by machining subsequent to the formation of the bracket 14. Consequently, the method according to the present embodiment permits the production of the bracket 14 with a reduced ratio of reject, while assuring the reduction of heat transfer and the increased force of bonding to the elastic body 20, with a high degree of stability.

Further, the present method using an extrusion technique makes it possible to fabricate an extruded one-piece structure which is a precursor for producing a large number of brackets 14 at one time. Accordingly, the cost of manufacture of each bracket 14 is reduced.

While the presently preferred embodiment of this invention has been described above for illustrative purpose only, it is to be understood that the invention is not limited to the details of the illustrated embodiment, but may be otherwise embodied.

For instance, the configurations and construction of the first portion 30 fixed to the power unit 18 and the second portion 36 fixed to the engine mount 12 may be modified as needed, depending upon the configurations of the power unit 18 and engine mount 12, and the required strength of the bracket 14, for instance.

Similarly, the configuration and construction of the engine mount 12 may be modified as needed, depending upon the required damping characteristics. Various known types of engine mounts may be used with the bracket 14.

The recessed and raised portions 44, 46 may be formed on the selected one or ones of the surfaces which define the selected ones of the apertures 40. In this case, the area of the exposed surface of the bracket 14 is further increased for improved efficiency of heat dissipation from the bracket 14.

Although the assembly 10 consisting of the engine mount 12 and the bracket 14 and the method of producing the assembly 10 have been described above, the principle of the present invention is equally applicable to a bracket for fixing any type of elastic mount other than the engine mount, an assembly of such elastic mount and bracket, and a method of producing the bracket. For instance, the present invention is applicable to a bracket for a muffler mount for mounting a muffler on the body of an automotive vehicle, and a bracket for various elastic mounts not used on the automotive vehicle. The principle of the present invention can be advantageously practiced particularly where the bracket is used in an environment in which heat is likely to be transferred through the bracket to an elastic mount which is fixed to one of two members that are to be elastically connected to each other through the elastic mount.

It is to be understood that the present invention may be embodied with various other changes, modifications and improvements, which may occur to those skilled in the art, without departing from the scope of the invention defined in the following claims:

What is claimed is:

1. A bracket made of an aluminum alloy for fixing an elastic mount to one of two members that are to be elastically connected to each other through said elastic mount interposed therebetween, the improvement comprising:

said bracket being formed by extrusion of said aluminum alloy, and having at least one aperture formed therethrough so as to extend in a direction of extrusion of said aluminum alloy; and said bracket having a first succession of recessed and raised portions formed on at least a part of a fixing surface thereof at which said bracket is adapted to be fixed to said elastic mount for elastic connection of said two members, and a second succession of recessed and raised portions provided for effective heat dissipation from said bracket, said second succession of recessed and raised portions being formed on at least a part of an exposed surface thereof which is exposed to an atmosphere and said one of said two members, the recessed and raised portions of each of said first and second successions extending in said direction of extrusion, and being formed alternately in a direction perpendicular to said direction of extrusion.

2. A bracket according to claim 1, wherein said first and second successions of recessed and raised portions have a dimension of 0.3–1.0 mm between a bottom of said recessed portions and a top of said raised portions, as measured in a direction perpendicular to said fixing surface and said exposed surface, said recessed and raised portions being alternately formed at a pitch of 0.5–2.0 mm in said direction perpendicular to said direction of extension.

3. A bracket according to claim 1, wherein said recessed and raised portions of said first succession define a continuously corrugated surface that provides said part of said fixing surface, while said recessed and raised portions of said second succession define a continuously corrugated surface which provides said part of said exposed surface.

4. A bracket according to claim 3, wherein each of said recessed and raised portions of each of said first and second successions is defined by a surface which is substantially arcuate in a cross section taken in a plane that is perpendicular to said direction of extrusion and said fixing and exposed surfaces.

5. A bracket according to claim 1, wherein
said bracket has an opening at an end portion adapted for receiving a fastener so that said bracket is attachable to the first member.

6. In an assembly for elastically connecting two members to each other, said assembly including an elastic mount and a bracket for fixing said elastic mount to one of said two members, the improvement comprising:

said bracket being formed by extrusion, and having at least one aperture formed therethrough so as to extend in a direction of extrusion of said bracket;

said bracket having a first succession of recessed and raised portions formed on at least a part of a bonding surface thereof at which said bracket is bonded to said elastic mount, and a second succession of recessed and raised portions provided for effective heat dissipation from said bracket, said second succession of recessed and raised portions being formed on at least a part of an exposed surface thereof that is exposed to an atmosphere when said bracket is bonded to said elastic mount and said one of said two members, the recessed and raised portions of each of said first and second successions extending in said direction of extrusion, and being formed alternately in a direction perpendicular to said direction of extrusion; and said elastic mount being bonded directly to said bonding surface of said bracket.

7. An assembly according to claim 6, wherein said bracket is made of an aluminum alloy.

8. An assembly according to claim 6, wherein said first and second successions of recessed and raised portions have a dimension of 0.3–1.0 mm between a bottom of said recessed portions and a top of said raised portions, as measured in a direction perpendicular to said bonding surface and said exposed surface, said recessed and raised portions being alternately formed at a pitch of 0.5–2.0 mm in said direction perpendicular to said direction of extension.

9. An assembly according to claim 6, wherein said recessed and raised portions of said first succession of said bracket cooperate with each other to define a continuously corrugated surface which provides said part of said bonding surface, while said recessed and raised portions of said second succession cooperate with each other to define a continuously corrugated surface which provides said part of said exposed surface.

10. An assembly bracket according to claim 9, wherein each of said recessed and raised portions of each of said first and second successions of said bracket is defined by a surface which is substantially arcuate in cross section taken in a plane which is perpendicular to said direction of extrusion and said fixing and exposed surfaces.

11. An assembly according to claim 6, wherein
said bracket has an opening at an end portion adapted for receiving a first fastener so that said bracket is attachable to the first member; and
said elastic mount has an opening therein adapted for receiving a second fastener so that said elastic mount is attachable to the second member.

12. A method of producing a bracket made of an aluminum alloy for fixing an elastic mount to one of two members which are to be elastically connected to each other through said elastic mount interposed therebetween, said bracket having a fixing surface at which said bracket is fixed to said elastic mount, and an exposed surface which is exposed to an atmosphere when said bracket is fixed to said elastic mount and said one of said two members, said method comprising the steps of:

forming an extruded structure by extruding an aluminum alloy, such that said extruded structure has at least one aperture formed therethrough so as to extend in a direction of extrusion of said aluminum alloy, and a first succession of recessed and raised portions formed on at least a part of a first surface thereof corresponding to said fixing surface of said bracket, and a second succession of recessed and raised portions formed on at least a part of a second surface thereof corresponding to said exposed surface of said bracket, the recessed and raised portions of each of said first and second successions extending in said direction of extrusion, and being formed alternately in a direction perpendicular to said direction of extension; and cutting said extruded structure in a plane perpendicular to said direction of extrusion, into a plurality of pieces each having has a predetermined dimension in said direction of extrusion, said each piece providing said bracket having at least one aperture corresponding to said at least one aperture of said extruded structure, and a first succession of recessed and raised portions and a second succession of recessed and raised portions which correspond to said first and second successions of recessed and raised portions formed on said first and second surfaces of said extruded structure, respectively, said first succession of recessed and raised portions of said bracket being formed on at least a part of said fixing surface, while said second succession of recessed and raised portions of said bracket being formed on at least a part of said exposed surface.

13. A method according to claim 12, wherein said first and second successions of recessed and raised portions of said extruded structure have a dimension of 0.3–1.0 mm between a bottom of said recessed portions and a top of said raised portions, as measured in a direction perpendicular to said first and second surfaces, said recessed and raised portions of said extruded structure being alternately formed at a pitch of 0.5–2.0 mm in said direction perpendicular to said direction of extension.

14. A method according to claim 10, wherein each of said recessed and raised portions of each of said first and second successions of said extruded structure is defined by a surface which is substantially arcuate in cross section taken in a plane which is perpendicular to said direction of extrusion and said first and second surfaces.

* * * * *